(12) United States Patent
Asher et al.

(10) Patent No.: US 7,844,677 B1
(45) Date of Patent: Nov. 30, 2010

(54) METHOD AND APPARATUS FOR REMOTE ALARM DATA DELIVERY

(75) Inventors: Michael L. Asher, Green Groove Springs, FL (US); Hossein Eslambolchi, Los Altos Hills, CA (US); Charles C. Giddens, Conyers, GA (US); Christopher Rollin Giles, Auburn, AL (US); Harold Jeffrey Stewart, Alpharetta, GA (US)

(73) Assignee: AT&T Intellectual II, L.P., Reno, NV (US)

( * ) Notice: Subject to any disclaimer, the term of this patent is extended or adjusted under 35 U.S.C. 154(b) by 239 days.

(21) Appl. No.: 11/786,472

(22) Filed: Apr. 12, 2007

Related U.S. Application Data (62) Division of application No. 10/409,369, filed on Apr. 8, 2003, now abandoned.

(51) Int. Cl.
*G06F 15/16* (2006.01)
(52) U.S. Cl. ............... 709/206; 709/204; 709/205; 455/428
(58) Field of Classification Search .......... 709/204, 709/205, 206; 455/428
See application file for complete search history.

(56) References Cited

U.S. PATENT DOCUMENTS

| | | | | |
|---|---|---|---|---|
| 6,310,889 B1 * | 10/2001 | Parsons et al. | ............... | 370/466 |
| 6,829,478 B1 * | 12/2004 | Layton et al. | ............... | 455/428 |
| 7,286,648 B1 * | 10/2007 | Chang et al. | ............... | 379/45 |
| 2002/0163427 A1 | 11/2002 | Eryurek et al. | | |
| 2003/0028599 A1 * | 2/2003 | Kolsky | ............... | 709/206 |
| 2004/0044554 A1 * | 3/2004 | Bull et al. | ............... | 705/8 |
| 2005/0002507 A1 * | 1/2005 | Timmins et al. | ............... | 379/188 |

\* cited by examiner

*Primary Examiner*—Jinsong Hu (57) ABSTRACT

In accordance with the teachings of the present invention, a method and apparatus is presented for alerting an operator of a network problem using a variety of contact devices. A server receives notification of a network problem. The server accesses presence information detailing the current location of an operator. The server then uses push technology to transmit alert information to the operator. As such, the alert information may be communicated directly to a client machine used by the operator. In the case where the operator is communicating through a contact device, which communicates with an interactive system, the alert information is forwarded to the interactive system, which communicates with the contact device.

19 Claims, 4 Drawing Sheets

| ROUTE ALERT TO | WHEN STATUS EQUALS |
|---|---|
| PHONE ▼ | AVAILABLE |
| PAGER ▼ | BUSY |
| CELLULAR ▼ | BE RIGHT BACK |
| CELLULAR (TEXT BASED) ▼ | DO NOT DISTURB |
| PHONE ▼ | NOT AT MY DESK |
| ALTERNATE ▼ | OUT OF OFFICE |
| EMAIL ▼ | ON THE PHONE |
| MY COMPUTER ONLY ▼ | ON VACATION |
| MY COMPUTER ONLY ▼ | OUT TO LUNCH |
| MY COMPUTER ONLY ▼ | IN TRAINING |
| MY COMPUTER ONLY ▼ | CUSTOM.... |

202 — ALTERNATE 1 TYPE: ⊘ NONE ▼
ALTERNATE 1:
204 — ALTERNATE 2 TYPE: ⊘ NONE ▼
ALTERNATE 2:

THE FOLLOWING PAGING COMPANIES ARE CURRENTLY SUPPORTED. IF YOU HAVE A DIFFERENT SERVICE PROVIDER PLEASE CALL ###-###-#### FOR ASSISTANCE.

PAGER COMPANY: NONE ▼

206 — PLEASE PROVIDE YOUR PIN NUMBER
PIN NUMBER:

208 —
EMAIL ADDRESS
EMAIL ADDRESS FOR TEXT PAGER:
EMAIL ADDRESS FOR CELL TEXT MSG.:

METHOD AND APPARATUS FOR REMOTE ALARM DATA DELIVERY

This application is a divisional application of prior U.S. patent application Ser. No. 10/409,369 filed Apr. 8, 2003 now abandoned which is incorporated herein by reference.

BACKGROUND OF THE INVENTION

1. Field of the Invention

This invention relates to information systems. Specifically, the present invention relates to communicating alert information.

2. Description of the Prior Art

Most modern businesses depend on communication networks for their operations. A malfunction in a communication network can have consequences that range from the sublime to the disastrous. For example, imagine the consequences if the communication network that supports the stock market went out of operation for a few minutes. Imagine the consequences if the communication network that supports air traffic control became dysfunctional for even a short period of time.

As a result, a variety of techniques have been developed to ensure that communication networks are always operational. Many of these techniques revolve around providing redundancy for the components in the communication network. However, even when redundancy is provided, there is still the need to correct problems when they occur. Therefore, in addition to redundant systems, timely correction of network problems is also required.

To facilitate timely correction of network problems, a variety of techniques have been developed. For example, network operations centers have developed ways to constantly monitor a network. In addition, automated systems which alert operators of network problems have also been developed. When an automated system alerts an operator of a problem, it is often critical that the operator receive the alert information as quickly as possible. However, many of the automated systems assume that the operator is in one location. The nature of an operator's job often requires the operator to be mobile or out in the field performing maintenance on the network. In addition, during off hours, one operations center may transfer network responsibility to a second operations center. Therefore, the alert information needs to be forwarded to the second operations center. Lastly, as a result of the advancement of technology, it is necessary to use a variety of devices to contact an operator. For example, some operators may be reached by telephone; however, other operators need to be reached by email, etc.

Thus, there is a need for a method and apparatus that alerts operators of network problems. There is a need for a method and apparatus that finds an operator and alerts the operator of a network problem. Lastly, there is a need for a method and apparatus that alerts an operator of a network problem regardless of the device that the operator is using.

SUMMARY OF THE INVENTION

A method and apparatus for implementing a follow me service is presented. The follow me service is used to communicate alert information to an end user, such as a network operator. In one embodiment of the present invention, a method and apparatus are presented which locate a network operator and communicate alert information to the network operator in real time at his current location.

Alert information is acquired in a server from a variety of alert systems. Presence information is accessed to determine the contact device that a network operator is currently using. Alert information is then forwarded using push technology to the contact device. In one embodiment of the present invention, the contact device communicates with the server through an interactive voice system. As such, the alert information may be pushed to the interactive voice system, translated, and then pushed to the contact device by the interactive voice system.

A method of forwarding alerts comprises the steps of acquiring alert information; accessing presence information in response to acquiring the alert information; generating contact information in response to accessing the presence information; and pushing the alert information to a contact device in response to generating the contact information.

A server comprises an input interface receiving alert information; a first memory storing presence information, the presence information associated with a plurality of contact devices; a second memory storing rules; a processor coupled to the input interface, coupled to the first memory and coupled to the second memory, the processor generating contact information in response to the alert information generated by the input interface, in response to the presence information stored in the first memory and in response to the rules stored in the second memory; and an output interface coupled to the processor, the output interface pushing output information to at least one of the plurality of contact devices associated with the presence information in response to generating the contact information.

A graphical user interface for configuring a service on a server, the service enabling the server to communicate alert information to contact devices, the graphical user interface comprises an end-user profile field for configuring presence information in the server; an alternate contact method field for providing alternate networks for contacting an end user subscribing to the service; a numeric pager setting field for configuring a pager contact number when the server attempts to contact the end user through a pager; an interactive voice setting field for configuring the server to communicate with an interactive voice system when the contact device is coupled through the interactive voice system; and a text message setting field for configuring the server with an email address when the contact device communicates with email.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
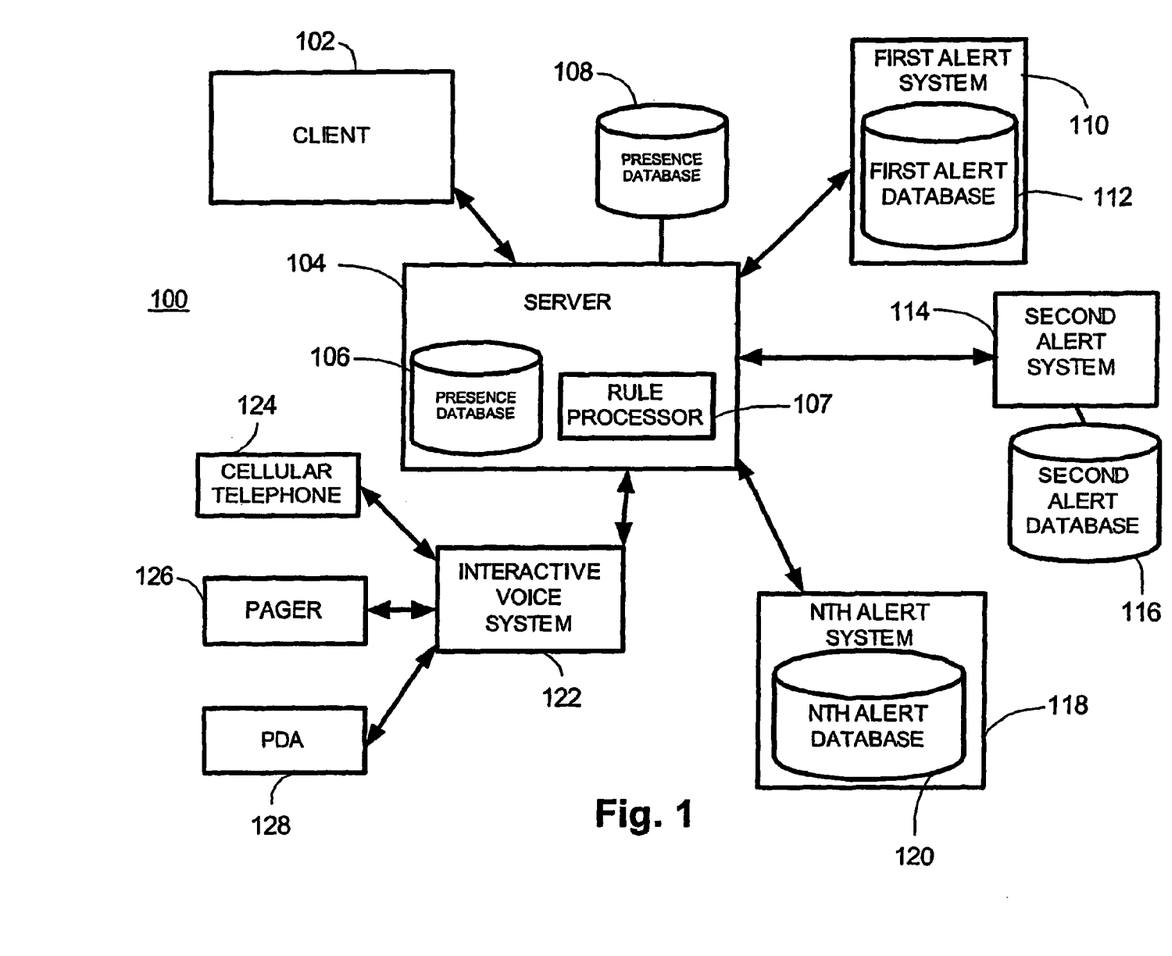
FIG. 1 displays a network implemented in accordance with the teachings of the present invention.

FIG. 1 displays an alert network 100 implemented in accordance with the teachings of the present invention. A client 102 is in communication with a server 104. The server 104 includes a rule processor 107 and the server 104 is in communication with a presence database (106, 108). A first alert system 110, a second alert system 114, and an Nth alert system 118 communicate with the server 104. Lastly, the server 104 is in communication with an interactive voice system 122, which is in communication with a contact device, such as a cellular telephone 124, a pager 126, or a Personal Data Assistant (PDA) 128.

During operation, an end user operating the client 102 accesses the server 104 and subscribes to services offered by the server 104. The server 104 operates a variety of services (i.e., methods) directed at acquiring alert information and pushing the alert information to the client 102 or a contact device. Alert information is acquired or generated by first alert system 110, second alert system 114, and Nth alert system 118. Each alert system may acquire alert information (i.e., alarms) and store the alert information in an alert database, such as first alert database 112, second alert database 116, and Nth alert database 120.

The server 104 acquires alert information from each alert system (i.e., 110, 114, 118). The server 104 may process the alert information (i.e., alert) using the rule processor 107. The server 104 then determines the location of an end user that should receive the alert by accessing a presence database 108. The server 104 then forwards the alert information to the client 102 or when necessary through interactive voice system 122 to the cellular telephone 124, the pager 126, or the PDA 128.

The client 102 and the server 104 may be implemented with software, hardware, or a combination of software and hardware. In addition, any component of the network, such as the client 102, the server 104, the first alert system 110, the second alert system 114, the Nth alert system 118, the interactive voice system 122, the cellular telephone 124, the pager 126, and the PDA 128, may be directly connected or connected via a network, such as a Local Area Network (LAN), wide area network (WAN), packet-switched network, circuit-switched network, or across another network suitable for the transmission of information.

The client 102 may be implemented with a computer, a cellular telephone 124, a pager 126, a PDA 128, etc. An end user, such as a network operator, uses the client 102 to access the server 104. In one embodiment of the present invention, the client 102 and the server 104 are implemented in an Internet environment. As such, the client 102 may use a user interface, such as a web browser, to access the server 104 across the Internet. The client 102 may select a Universal Resource Locator (URL) to make a connection with the server 104 and to pass a query or request to the server 104.

In one embodiment of the present invention, the client 102 is a passive device that listens for alert information. For example, the client 102 may listen on a port for information communicated from the server 104. Therefore, when alert information is available in the server 104, the server 104 pushes the alert information to the client 102. Pushing the alert information requires that the server 104 transmit information to the client 102 through an exit point in the server 104, such as a specific port with a destination address. The destination address may be a specific Internet Protocol (IP) address, a specific cellular telephone number, etc. The client 102 is listening for information on that specific port or cellular telephone number. Therefore, when the alert information is pushed to the client 102 on the port or cellular telephone, the client 102, which is operating in a passive mode, receives the alert information. It should be appreciated that because the client 102 is always listening, the alert information may be pushed to a client 102 in real time. In an alternative embodiment of the present invention, the client 102 may interact with the server 104 in an active mode. During an active mode, the client 102 may query the server 104 to acquire the alert information. For example, the client 102 may query the server 104 at predefined intervals to receive the alert information.

Figure 2:
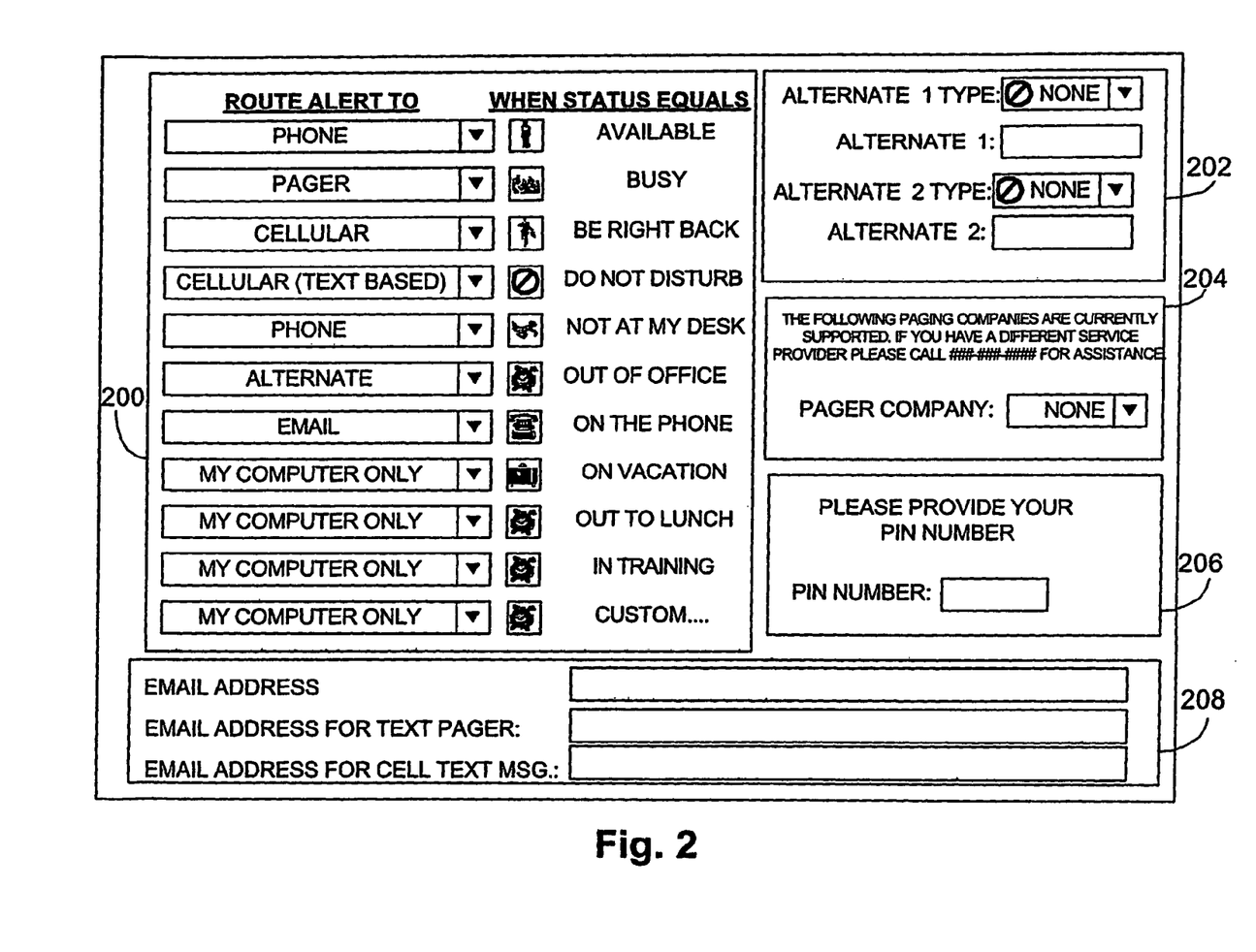
FIG. 2 displays a graphical user interface implemented in accordance with the teachings of the present invention.

In one embodiment of the present invention, the client 102 is implemented with a display. The end user configures services on the server 104 by operating a graphical user interface (GUI) provided in the display. FIG. 2 displays a GUI implementing the teachings of the present invention. In one embodiment of the present invention, the GUI includes (1) end-user profile field(s) 200; (2) alternate contact method field(s) 202; (3) numeric pager setting field(s) 204; (4) interactive voice setting field(s) 206; and (4) text message setting field(s) 208.

The end-user profile field(s) 200 enables the end user to define where the alert network (i.e., server 104) should route information if different conditions are met. For example, the end-user profile field(s) may include fields which define how to route alert information when the end user is available, busy, will be right back, does not want to be disturbed, is not at the desk, is out of the office, is on the phone, is on vacation, is out to lunch, is in training, or has another condition which is not specified above.

Each of the foregoing conditions may be presented to the end user, in a GUI, and then an input area may be provided, in the GUI, so that the end user can specify an alternate contact location or device when the condition is met. As a result, the presence database (106, 108) is updated and the server will push the alert information to the alternate contact location or device when the condition is met. To illustrate the operations of the end-user profile fields, some examples are presented. When the "end user is available," the alert information may be routed to the work phone number. When the "end user is busy," the alert information may be routed to the text pager. When the "end user will be right back," the alert information may be routed to the cellular telephone (i.e., voice). When the "end user does not want to be disturbed," the alert information may be routed to the cellular telephone (i.e., text message). When the "end user is not at the desk," the alert information may be routed to the work telephone. When the "end user is out of the office," the alert information may be routed to an alternate person. When the "end user is on the telephone," the alert information may be routed to an email address. When the "end user is on vacation," "out of touch," "out to lunch," "in training," or a custom option has been defined, the alert information may be forwarded to the computer. It should be appreciated that, in the examples, the alert information is pushed to one device for each condition. However, the same alert information may be pushed to a variety of devices simultaneously when a condition is met.

The GUI enables the end user to configure alternate contact methods through alternate contact methods field(s) 202, such as forwarding the alert information across custom networks, etc. Using the numeric pager settings field(s) 204, the GUI enables an end user to configure the number of the pager company that can be used to contact the end user by pager. Using the interactive voice setting field(s) 206, the GUI enables an end user to configure the Personal Identification Number(s) (PIN) that is used when the interactive voice system is implemented. Using the text messaging setting field(s) 208, the end user can provide an email address for the text pager and/or provide an email address for a text message to be directed to a cellular telephone.

The end-user profile information, the alternate contact method information, the numeric pager setting information, the interactive voice setting information, and the text message setting information are maintained in the presence databases (106, 108). Inputting information in a GUI, ultimately, configures the server 104 by updating the presence database (i.e., 106, 108) with the appropriate information for routing alert information.

Using the client 102 (i.e., a GUI), an end user, such as a network operator, may also subscribe to various services offered by the server 104. For example, the end user may subscribe to an alert service. When the end user subscribes to the alert service, alerts are forwarded to the end user at the locations defined by the end user. As such, once the end user has subscribed to the alert service running in the server 104, the server 104 will run alert methods and push alert information to the end user on the client 102 when server 104 acquires the alert information. Therefore, once the client 102 subscribes to a service, such as the alert service, the client 102 listens for alerts that are transmitted by the server 104. For example, if the client 102 is implemented on a computer, the client 102 may listen on a specific port for the alert information. If the client 102 is implemented in a cellular phone, the client 102 may listen for an alert to be communicated using short messaging service. The specific details or the type of communication path (i.e., ports, protocols, etc.) and the specific alert information that should be transmitted may be configured when the end user subscribes to the service. In addition to individuals that subscribe to a service, a group may subscribe to a service. Therefore, the group may receive alert information when alert information is received in the server 104. As such, each client 102 operated by a member of a group is configured to receive the alert information.

Server 104 acquires alert information from the alert systems (110, 114, 118), processes the alert information, and then pushes the alert information to a client 102 or to contact devices (124, 126, 128) through the interactive voice system 122. In one embodiment of the present invention, the server 104 provides a number of services by operating a variety of different methods. Methods are steps performed by the server 104. For example, an end user may use the client 102 to subscribe to an alert service. The alert service may include many methods, such as a method to poll each alert system for information, or a method to listen on a port for information generated by an alert system, or methods to access presence information and process alert information through a rule processor 107. It should be appreciated that a variety or combination of these methods may be implemented and still remain within the scope of the present invention.

An end user subscribes to services on the server 104 using client 102. By subscribing to the services on the server 104, configuration information is exchanged between the client 102 and the server 104. As such, the client 102 may listen for alert information pushed from the server 104. In addition, by subscribing to a service on the server 104, a number of methods are launched in the server 104 to acquire alert information, to process the alert information, to access the presence information, and then to push the alert information to the client 102, which is listening for the alert information.

The server 104 may provide the services and implement the method using a variety of technologies. For example, the server 104 may be deployed in an Internet environment and use various types of Internet technologies, such as Remote Procedure Calls (RPC), Extended Markup Language (XML), Active Server Page technology, or Web Services technology.

The server 104 may include a variety of methods implemented with XML. As such, each alert system may be accessed and information may be retrieved using RPC or XML-based technologies, such as Document Type Definitions (DTD), Cascading Style Sheets (CSS), and Extensible Style Sheet Language (XLS).

In another embodiment of the present invention, the server 104 may be implemented with Active Server Pages or other scripting technology, such as Common Gateway Interface (CGI). As such, when the client 102 performs a request to the server 104, the server 104 acquires alert information by performing various scripts and then generates a response that is understood by a browser implemented in client 102. The browser may then use an Internet technology, such as Hypertext Markup Language (HTML) to display the alert information.

In another embodiment of the present invention, server 104 may be implemented with Web Services. The Web Services model is promulgated by the World Wide Web Consortium (W3C). Using Web Services, the server 104 can provide clients 102 with transparent access to program components which may reside in one or more different systems (i.e., first alert system 110, second alert system 114, Nth alert system 118) even though the components running on the different alert systems run under different operating systems and may be written in different programming languages.

The Web Services architecture may include Simple Object Access Protocol (SOAP) version 1.2, W3C, Dec. 19, 2002, Hypertext Transfer Protocol (HTTP) described in Request For Comments ("RFC") 2616 from the Internet Engineering Task Force, entitled Hypertext Transfer Protocol—HTTP/ 1.1" (June 1999); Web Services Description Language (WSDL) as defined in version 1.2, W3C, Working Draft 24 Jan. 2003; and registry services, such as Universal Description, Discovery, and Integration (UDDI), etc. It should be appreciated that while specific versions of the foregoing technologies have been identified, it is fully anticipated that standards will change and that new versions of the standard will be deployed. However, the present invention is based on the underlying model and technologies as well as fundamental implementation tools, such as XML, client-server architectures, the underlying Web Services model, etc. Therefore, changes to the versions of the foregoing standards may be made and still remain within the scope of the present invention.

Web Services are based on XML. SOAP is an XML-based protocol for exchanging and communicating information between computers. UDDI is a directory for binding businesses and Web Services. WSDL is a grammar for defining the public interface of a Web Services application.

In a Web Services implementation, the client 102 may communicate with the server 104 using SOAP, HTTP, XML-RPC, etc. The server 104 may then operate based on methods resident in the server 104 or the server 104 may communicate with first alert system 110, second alert system 114, and Nth alert system 118 to run methods on these respective alert systems. In addition, server 104 may operate based on methods which use rule processor 107 and/or access presence databases (106, 108).

Server 104 is associated with a variety of presence databases (106, 108). The presence database 106 may be directly connected to the server 104. In one embodiment of the present invention, the server 104 may use a Direct Library Link (DLL) method to access presence information in the presence database 106. The server 104 may also use a network connection, such as a LAN, WAN, or other network connection, such as the Internet, to access presence database 108. Therefore, the server 104 may use Extensible Markup Language (XML) to communicate with the presence database 108. It should be appreciated that the server 104 may use any combination of techniques to communicate with the presence databases (106, 108).

In one embodiment of the present invention, the presence database 106 is a relational database searchable with a key. As such, the presence database 106 is used to correlate presence information. Presence information may include any information required to contact the client 102. Illustrative presence information includes user identification information, time of day information, contact device number information, email information, etc. Since the presence information may be implemented in a relational database, the presence information may correlate time of day with a specific contact device. As such, the server 104 may forward alert information to the appropriate contact device and reach the end user. In an alternative embodiment of the present invention, the presence database 108 may be implemented as a flat file, such as a log file, and the server 104 may access the flat file using XML.

The server 104 is also associated with a rule processor 107. The rule processor 107 may be directly connected to the server 104 or the rule processor 107 may communicate across a network to the server 104. The rule processor 107 prioritizes alert information received from the alert systems (110, 114, 118) and then pushes the alert information to an end user (i.e., network operator) based on a set of predefined rules or criteria. Further, the rule processor 107 may analyze the alert information and then forward the alert information based on a set of rules. The rules may range from very simple rules to complex rules. An illustrative simple rule may include a rule that forwards alert information with a priority of "1." An illustrative complex rule may include a rule which analyzes cable cut information from several alert systems (110, 114, 118) identifying the main cable which caused the other cables to report an alert, prioritizing the alert information, and then forwarding the alert information to an emergency number based on the criticality of the alert information.

The first alert database 112, the second alert database 116, and the Nth alert database 120 include first alert information, second alert information, and Nth alert information, respectively. In one embodiment of the present invention, the alert information (i.e., first, second, third) includes any information that characterizes the operation of the network or any information generated to alert an end user (i.e., network operator) of a condition in the network. Specifically, the alert information includes any information that signals a malfunction in a network—for example, information on cable cuts, information on malfunctioning equipment, performance information, log file changes, corrupted data, lack of data or communication response, correlated information (i.e., combined information that signals a malfunction), etc. The alert information may be provided as text, images, voice, or video. For example, an alert system may use a camera for data acquisition and identify network problems based on the video. The video would then provide the alert information, which may be forwarded through the server 104 to an end user.

The alert systems (110, 114, 118) represent a variety of alert systems for acquiring information about a communication network (i.e., alert information). For example, first alert system 110 may be a real-time data acquisition system that acquires information on cables in a network. In one embodiment of the present invention, the first alert system 110 may be implemented as a passive alert system and receive alert data from the network. For example, if a cable is cut in the network, information on the cable that is cut may be communicated to the first alert system 110. The information may then be stored in the first alert database 112. The second alert system 114 may be an active alert system that actively tests the network or polls for information. For example, the second alert system 114 may periodically communicate with a piece of equipment in the network or periodically test a log file in the network. As such, when communication equipment does not respond or the log file changes, the second alert system 114 may log the failure or change a log file stored in the second alert database 116. It should be appreciated that both alert systems may function as passive, active, or a combination of the two.

In one embodiment of the present invention, both the first alert system 110 and the second alert system 114 may provide alert information on an internal network (i.e., company-owned network). The Nth alert system 118 may represent a plurality of external or third party networks that communicate alert information. Further, the Nth alert system may be implemented as a passive alert system, an active alert system, or a combination of the two. The Nth alert system 118 may be implemented as a third party alert system, which acquires network operations information (i.e., alert information) and communicates the alert information from the third party network to the server 104. The Nth alert system 118 may reside within the network housing the server 104, may function as an interface between the network housing the server 104 and the third party network, or may reside within the third party network.

In addition to alert information associated with networks, other types of alert information generated by other systems are within the scope of the present invention. For example, alert information may be generated by a large variety of systems ranging from a computer, to a fire alarm system, to a sprinkler system, etc.

The alert information may also be categorized into various levels. For example, in one embodiment of the present invention, several priority levels may be defined. The priority levels may be based on the type of alert information. For example, alert information generated as a result of an inability to communicate with a server 104 may have a higher priority than alert information generated because of corrupted data or a change in a log file. In addition, alert information priority may be based on the alert system (110, 114, 118) generating the alert. For example, if the Nth alert system is a customer alert system and the second alert system is an internal alert system, a higher priority may be given to the alerts generated by the customer alert system (i.e., Nth alert system 118).

In one embodiment of the present invention, priority may be assigned to the alert information at the alert system (110, 114, 118) or priority may be assigned to the alert information at the server 104. When priority is assigned to the alert information at the alert system (i.e., 110, 114, 118), the alert systems may also include a rule processor 107, which applies rules to the priority and determines the alert information that should be forwarded to the server 104 or made available for access by the server 104.

In another embodiment of the present invention, a multi-tiered priority system may be implemented. In the multi-tiered priority system, the alert systems may either assign priority to the alert information and/or apply rules to the alert information. The server 104 will then assign priority to alert information that is received in the server 104 or apply rules to the priorities that were already set in the alert systems (110, 114, 118). As a result, two or more (multi-tiered) priority processing levels may be applied to the alert information. The server 104 may then push alert information that has been processed using the multi-tiered priority processing to the end user.

The server 104 is in communication with an interactive voice system 122. The interactive voice system 122 provides communication from the server 104 to a variety of contact devices, such as cellular telephone 124, pager 126, and PDA 128. It should be appreciated that the server 104 may communicate with the interactive voice system 122 across a variety of networks. For example, the server 104 may communicate across a packet-switched network, a circuit-switched network, or another network appropriate for communication.

The interactive voice system 122 translates text-to-speech information and speech-to-text information. In addition, the interactive voice system 122 may interact with contact devices. For example, the interactive voice system 122 is in communication with a variety of contact devices, such as cellular telephone 124, pager 126, and PDA 128. In the scenario where a contact device, such as pager 126, requires a PIN number to leave a message, the interactive voice system 122 is capable of receiving the alert information and the PIN number from the server 104 (i.e., from the presence database (106, 108)), receiving a voice prompt from the pager 126 to enter the PIN number, providing the PIN number to the pager 126, and then providing the alert information to the pager 126 in the required format. It should be appreciated that the previous example is provided for illustration and the interactive voice system 122 is any system capable of performing interactive communication with a contact device.

Figure 3:
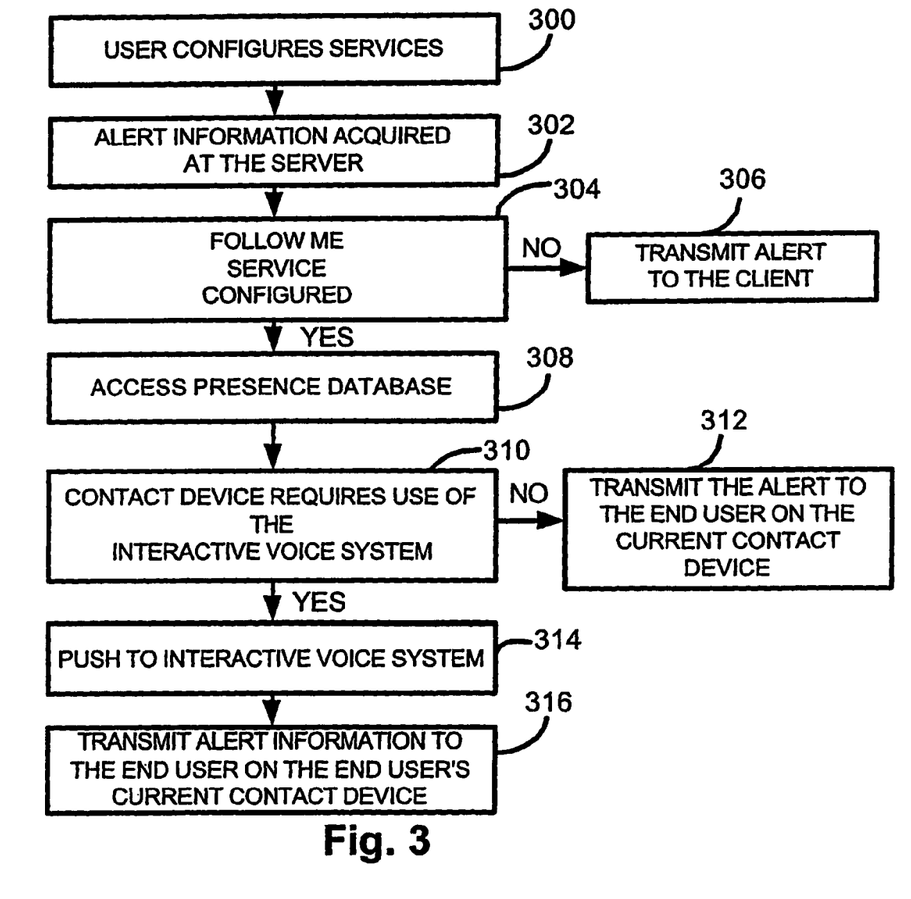
FIG. 3 displays a flow chart depicting a method implemented in accordance with the teachings of the present invention.

FIG. 3 displays a method implemented in accordance with the teachings of the present invention. FIG. 3 will be discussed in conjunction with the alert network depicted in FIG. 1. In FIG. 3, an end user operates the client 102. As stated at 300, the end user operates the client 102 to configure services operating in the server 104. In one embodiment of the present invention, the alert network 100 is capable of providing the client 102 with alert services, such as follow me services. Follow me services are services provided by the alert network 100, which enable the alert network 100 to push (i.e., forward to a listening client) alert information to an end user at predefined locations.

In FIG. 3, once the user configures the alert services, as stated at 300, the server 104 acquires the alert information as shown in 302. The alert information is acquired from one of the alert systems (110, 114, 118). Although a variety of methods may be used to communicate the alert information to the server 104, for the purposes of illustration, five methods will be presented. The server 104 may acquire alert information by using (1) XML; (2) Simple Object Access Protocol (SOAP); (3) HTTP; (4) Direct connection using DLL; and (5) Polling.

When the server 104 uses XML, alert data is communicated in an XML-compliant file to the server 104. The file is placed in a directory where the server 104 can access the file. Since an XML file includes metadata that is used to interpret the alert information, the server 104 uses the metadata to interpret the alert information in the file.

In the second method of acquiring data, the server 104 uses SOAP. SOAP is a lightweight protocol for the exchange of information in a decentralized, distributed environment (i.e., alert network 100). SOAP is an XML-based protocol that consists of three parts: (1) an envelope that defines a framework for describing what is in an alert message and how to process an alert message; (2) a set of encoding rules for expressing instances of application-defined data types (i.e., metadata used to interpret the alert information stored in an alert message); and (3) a convention for representing remote procedure calls and responses between the server 104 and the alert systems (110, 114, 118).

In the third method of acquiring data, the server 104 uses the Hypertext Transfer Protocol (HTTP) to acquire the alert information. The alert information is then posted to a web page where an end user may access the alert information. In the fourth method, the server 104 and/or the first alert system 110 use a DLL method to open a communication pathway. DLL is short for Dynamic Link Library, which is a library of executable functions or data that can be used by a windows application. Typically, a DLL provides one or more functions and a program accesses the functions by creating either a static or dynamic link to the DLL. A static link remains constant during program execution while a dynamic link is created by the program as needed. DLLs can also contain just data. In addition, a DLL can be used by several applications at the same time. In the fifth method of acquiring data, the server 104 may poll the alert systems (110, 114, 118) to acquire the alert information.

Once the server 104 acquires the alert information, the server 104 performs processing (i.e., presence database (106, 108) lookup, rule processing (107)) and then transmits the alert information to the end user. In one embodiment of the present invention, the server 104 uses push technology to transmit the information to the end user. With push technology, the server 104 unilaterally transmits the alert information to the client 102 or to the contact devices (124, 126, 128). This may require that the server 104 open a connection, such as a socket connection, with the client 102; or in the case where a connection is already established (i.e., the end user has already configured the alert service), the server 104 accesses a communication pathway that was previously configured and transmits the alert information on the communication pathway. As a result, the server 104 is used to provide a data pathway for the alert systems (110, 114, 118). In one embodiment of the present invention, third party networks (i.e., Nth alert system 118) may provide alert information to the server 104 and the server 104 can then push the alert information to an end user via a contact device (i.e., client 102, cellular telephone 124, pager 126, and PDA 128).

At step 304 of FIG. 3, a test is made to determine if the follow me service is configured. If the follow me service is not configured, the alert information is delivered to the client 102 as stated at 306. If the follow me service is configured, the presence database (106, 108) is accessed as stated at 308 to determine the location that the end user has defined for delivery of the alert information.

Accessing the presence database (106, 108) produces contact information. The contact information may be any information required to contact an end user. As such, the contact information may include a telephone number, IP address, port number, email address, etc. that may be used to contact an end user and push the alert information to the end user. The contact information is typically defined and stored in the system when the end user configures the system using the GUI described and detailed previously. The contact information may be generated before the alert information is processed by a rule processor 107 or after the alert information is processed by a rule processor 107.

If the end user has not specified a contact device that requires use of the interactive voice system 122 as stated at 310, then the server 104 pushes the alert information to the end user on the contact device that was specified as stated at 312. If the end user has specified a contact device that requires use of the interactive voice system 122, then the server 104 pushes the alert information to the interactive voice system 122 as stated at 314. The interactive voice system 122 then transmits the alert information to an end user on the end user's current contact device (i.e., cellular telephone 124, pager 126, PDA 128, instant messaging device, etc.) as shown in 316.

Figure 4:
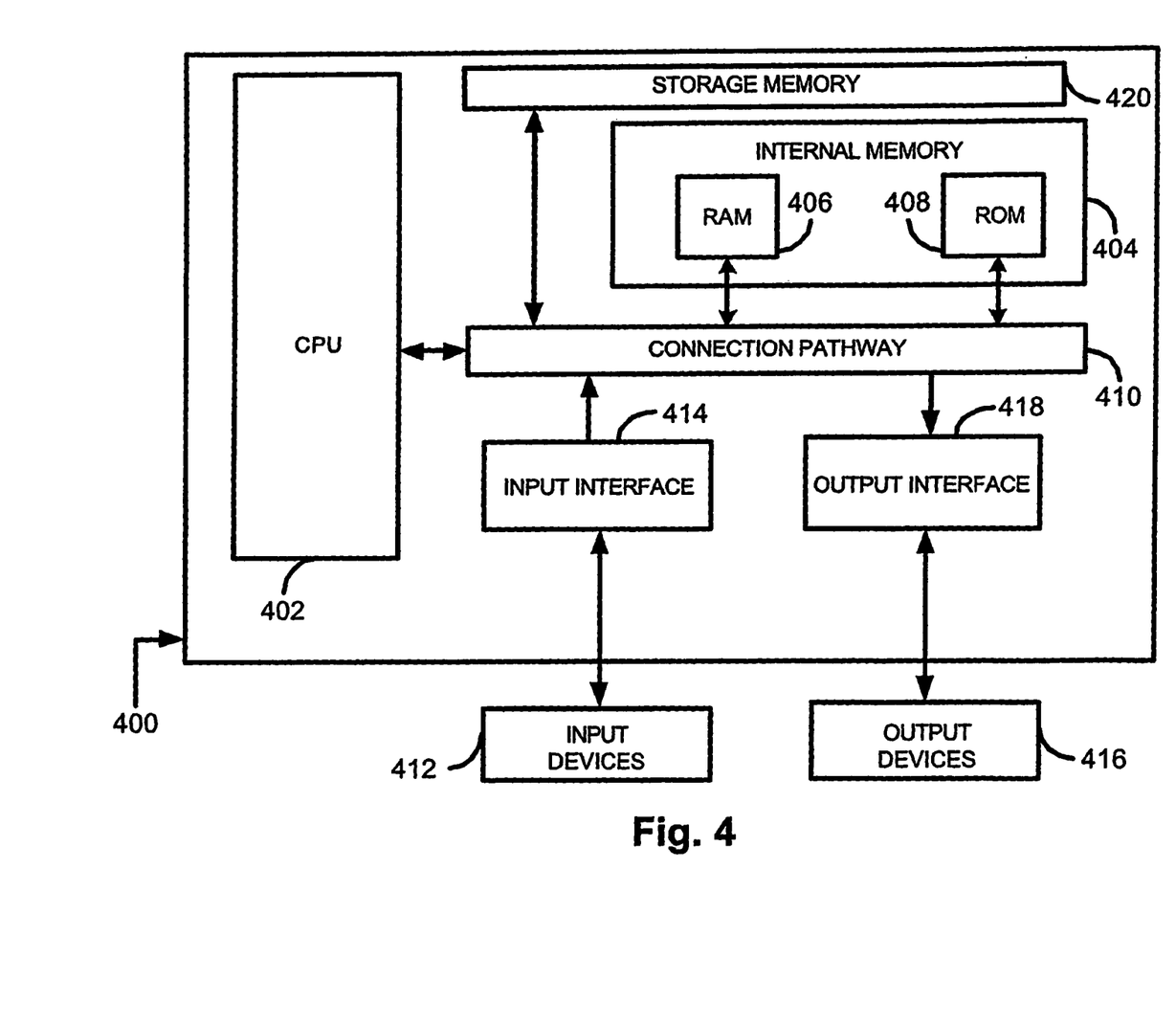
FIG. 4 displays a block diagram of a computer implemented in accordance with the teachings of the present invention.

FIG. 4 is a block diagram of a computer 400 implemented in accordance with the teachings of the present invention. Client 102, server 104, first alert system 110, second system 114, Nth system 118, interactive voice system 122, cellular telephone 124, pager 126, and PDA 128 may each be implemented with a computer 400. A central processing unit (CPU) 402 functions as the brain of the computer 400. Internal memory 404 is shown. The internal memory 404 includes short-term memory 406 and long-term memory 408. The short-term memory 406 may be Random Access Memory (RAM) or a memory cache used for staging information. The long-term memory 408 may be a Read Only Memory (ROM) or an alternative form of memory used for storing information. A connection pathway 410 is used by the computer 400 to control the access and retrieval of information from short-term memory 406 and long-term memory 408. Storage memory 420 is also shown. Storage memory may be a hard drive or other memory for storing large amounts of data. The storage memory 420 is in communication with the connection pathway 410. In addition, the connection pathway 410 may be connected to interfaces, which communicate information out of the computer 400 or receive information into the computer 400.

Input devices, such as a joystick, a keyboard, a microphone, a communication connection, or a mouse, are shown as 412. The input devices 412 interface with the system through an input interface 414. In addition, any information coming into computer 400 may utilize input interface 414. Output devices, such as a monitor, a speaker, a communication connection, etc., are shown as 416. The output devices 416 communicate with the computer 400 through an output interface 418. Further, any information communicated out of computer 400 may use output interface 418. In one embodiment of the present invention, the output device 416 may be implemented as a monitor or display that is used to display a GUI.

In one embodiment of the present invention, server 104 may be implemented in computer 400. As such, client 102, presence database 106, first alert system 110, second alert system 114, and Nth alert system 118 may be considered input devices 412. In addition, alert information may be received from the alert systems on input interface 414. Client 102, presence database 108, and the interactive voice system 122 may be considered output devices 412. Alert information may be communicated to client 102, presence database 108, and interactive voice system 122 through output interface 418.

CPU 402 may function as rule processor 107. Rules may be stored in storage memory 420 or in internal memory 404. As such, CPU 402 may process alert information based on rules accessed from storage memory 420 or internal memory 404.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A server comprising:
   a rule processor adapted to prioritize received alert information; and
   a graphical user interface for configuring a service on the server, the service enabling the server to communicate the alert information to contact devices based on the priority of the alert information, the graphical user interface comprising:
   an end-user profile field for configuring alert routing based on user presence information in the server;
   an alternate contact method field for providing alternate networks for contacting an end user subscribing to the service;
   a numeric pager setting field for configuring a pager contact number for use by the server to contact the end user through a pager;
   an interactive voice setting field for configuring the server to communicate with an interactive voice system when the contact device is coupled through the interactive voice system;
   a PIN number field for configuring a PIN number associated with a pager; and
   a text message setting field for configuring an email address for use by the server to contact the end user via email.

2. A server as set forth in claim 1, wherein the graphical user interface is deployed in a web browser.

3. A server as set forth in claim 1, wherein the alert information is forwarded to the contact devices using push technology.

4. A server as set forth in claim 3, wherein the alert information is simultaneously pushed to the contact devices.

5. A server as set forth in claim 1, wherein the user presence information includes temporal information correlating a contact device with a specific time.

6. A server as set forth in claim 1, wherein the presence database is implemented as a flat file.

7. A server as set forth in claim 6, wherein the server is configured to access the flat file using Extensible Markup Language (XML).

8. A server as set forth in claim 1, wherein the alert information is prioritized using a numerical representation.

9. A server as set forth in claim 1, wherein the alert information is forwarded to the contact devices based on a criticality of the alert information.

10. A method comprising:
    prioritizing received alert information using a rule processor;
    configuring a service on a server based on inputs to a graphical user interface, the service enabling the server to communicate the alert information to contact devices based on the priority of the alert information;
    configuring alert routing based on user presence information in the server using an end-user profile field;
    providing alternate networks for contacting an end user subscribing to the service using an alternate contact method field;
    configuring a pager contact number for use by the server to contact the end user through a pager using a numeric pager setting field;
    configuring the server to communicate with an interactive voice system when the contact device is coupled through the interactive voice system using an interactive voice setting field;
    configuring a PIN number associated with a pager using a PIN number field; and
    configuring an email address for use by the server to contact the end user via email using a text message setting field.

11. A method as set forth in claim 10, wherein the graphical user interface is deployed in a web browser.

12. A method as set forth in claim 10, wherein the alert information is forwarded to the contact devices using push technology.

13. A method as set forth in claim 12, wherein the alert information is simultaneously pushed to the contact devices.

14. A method as set forth in claim 10, wherein the user presence information includes temporal information correlating a contact device with a specific time.

15. A method as set forth in claim 10, wherein the presence database is implemented as a flat file.

16. A method as set forth in claim 15, wherein the server is configured to access the flat file using Extensible Markup Language (XML).

17. A method as set forth in claim 10, wherein the alert information is prioritized using a numerical representation.

18. A method as set forth in claim 10, wherein the alert information is forwarded to the contact devices based on a criticality of the alert information.

19. An article of manufacture including a non-transitory computer-readable medium having instructions stored thereon that, in response to execution by a computing device, causes the computing device to perform operations comprising:

prioritizing received alert information;

configuring a service on a server based on inputs to a graphical user interface, the service enabling the server to communicate the alert information to contact devices based on the priority of the alert information;

configuring alert routing based on user presence information in the server;

configuring alternate networks for contacting an end user subscribing to the service;

configuring a pager contact number for use by the server to contact the end user through a pager;

configuring the server to communicate with an interactive voice system when the contact device is coupled through the interactive voice system;

configuring a PIN number associated with a pager; and configuring an email address for use by the server to contact the end user via email.

\* \* \* \* \*

UNITED STATES PATENT AND TRADEMARK OFFICE
CERTIFICATE OF CORRECTION

PATENT NO. : 7,844,677 B1  
APPLICATION NO. : 11/786472  
DATED : November 30, 2010  
INVENTOR(S) : Michael L. Asher et al.

Page 1 of 1

It is certified that error appears in the above-identified patent and that said Letters Patent is hereby corrected as shown below:

On the Title page, Item (73) "AT&T Intellectual II, L.P." should read -- AT&T Intellectual Property II, L.P. --

Signed and Sealed this
Fifteenth Day of March, 2011

David J. Kappos
*Director of the United States Patent and Trademark Office*